UNITED STATES PATENT OFFICE.

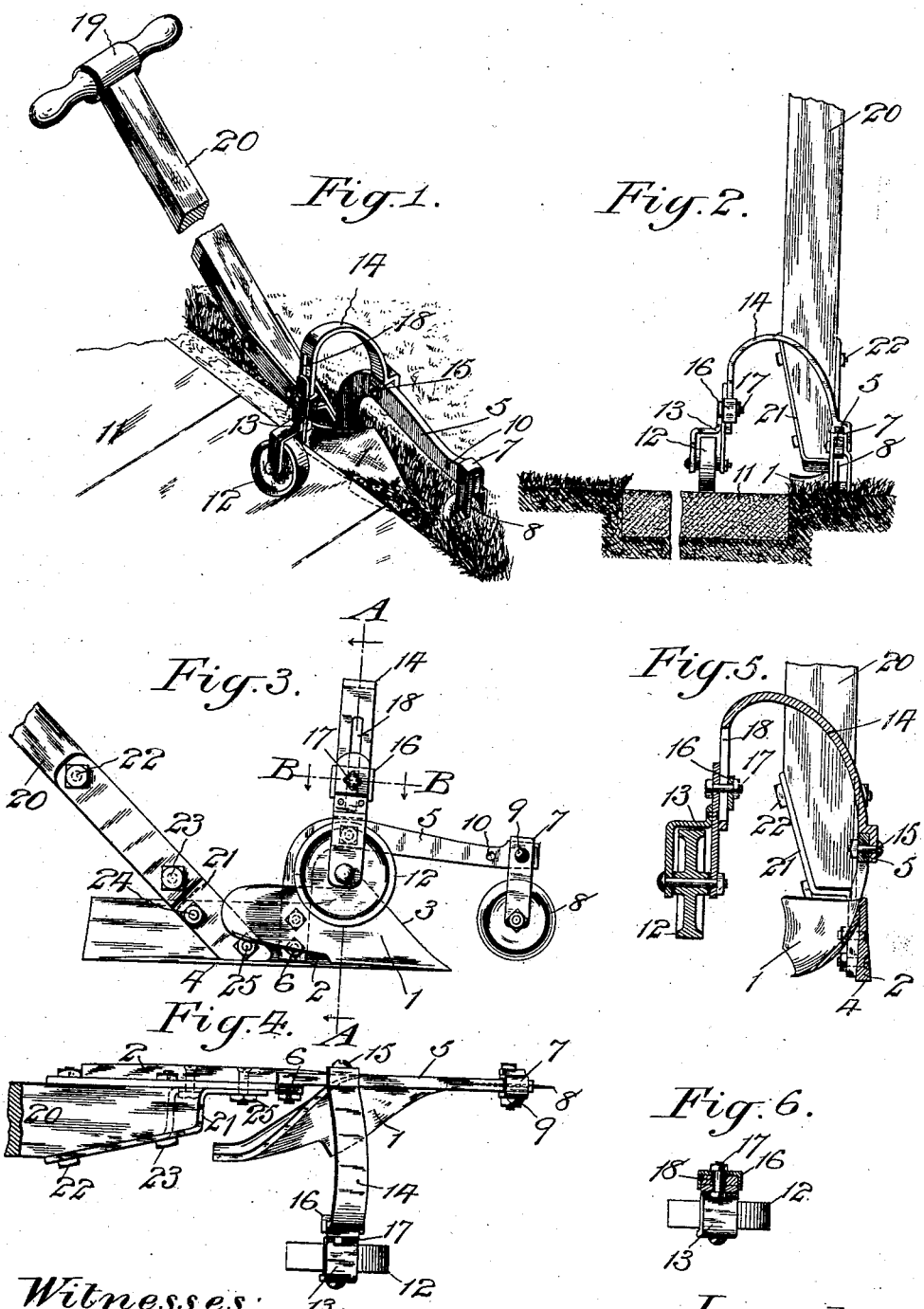

CHARLES C. WHEELER, OF HOLLAND, MICHIGAN.

EDGE-TRIMMER FOR LAWNS.

No. 918,239.  Specification of Letters Patent.  Patented April 13, 1909.

Application filed August 4, 1908. Serial No. 446,897.

*To all whom it may concern:*

Be it known that I, CHARLES C. WHEELER, a citizen of the United States, and resident of Holland, in the county of Ottawa and State of Michigan, have invented a new and useful Edge-Trimmer for Lawns, of which the following is a specification.

My invention relates to an edge trimmer for lawns, with the object in view of providing a simple and effective device for rapidly trimming the edges of a lawn along the sides of a walk, road or flower-bed, as the case may be.

In the accompanying drawings, Figure 1 is a view of the implement in perspective, showing it in position for use, Fig. 2 is a view of the same in front elevation, Fig. 3 is a view of the implement in side elevation, Fig. 4 is a top plan view, Fig. 5 is a view of the same in transverse section taken in the plane of the line A—A of Fig. 3, and Fig. 6 is a horizontal section in the plane of the line B—B of Fig. 3.

The body of the implement is in the form of a sharp plow, the mold-board 1 uniting with the land-side 2 in a sharp edge 3 at the front, and the land-side 2 being extended rearwardly to form a long bearing edge 4. This sharp plow has a beam 5 secured to the land-side 4 at its rear end by suitable fastening devices, in the present instance by bolts 6, and extends thence upwardly and then curves over toward the front extending over the nose of the plow in a horizontal direction and provided at its forward end with a bifurcated hanger or bracket 7 between the branches of which a sharp edged disk 8 is mounted. This bracket or hanger 7 receives the forward end of the beam 5 and is conveniently secured to the beam by means of a bolt 9.

The beam 5 is provided with one or more additional holes 10 therethrough, the hole 10 here shown being lower than the hole through which the bolt 9 extends, and also nearer the front edge 3 of the plow. This serves to make the disk 8 cut deeper if required and also locates it in nearer proximity to the front edge of the plow. The hanger or bracket 7 is so located as to mount the disk 8 in the plane of the land-side 2 of the plow and the disk is intended to be located at such height from the bottom of the plow as to cut through the turf along the edge of the walk permitting the edge 3 of the plow and at the front of the land-side to follow along the cut made by the disk 8, the mold-board 1 serving to throw the dirt and turf cut from the edge of the lawn off a distance from the edge of the lawn onto the walk, path or flower-bed represented, in the present instance, as a paved walk 11.

The depth to which the plow is allowed to go, is determined by a wheel 12 carried in a bracket 13 secured to the downwardly extended end of a curved arm 14, fixed to the beam 5 in the present instance by a bolt 15. The bracket 13 is secured to the downwardly extending portion of the arm 14 in vertical adjustment by means of a sliding washer 16 which embraces the opposite edges of the arm 14, a bolt 17 extending through the sliding washer 16 and through the bracket 13 and also through a vertically elongated slot 18 in the arm 14. In the present instance, the arm 14 is shown as extending from the beam 5 of the implement over toward the walk or path away from the lawn which is to be trimmed but it is obvious that if so desired the arm 14 may be applied to the plow beam so as to extend therefrom in the opposite direction, *i. e.*, over toward the turf or lawn and the wheel 12 may rest on the lawn *a* to be trimmed instead of on the path along adjacent to the lawn.

The implement is conveniently operated by means of a handle piece 19 adapted to receive both hands of the operator, a shank 20 leading from the handle piece 19 in a downwardly and forwardly slanting direction to a bifurcated connecting piece 21 between the branches of which the shank 20 is secured in the present instance by means of bolts 22, 23, the lower end of the connecting piece 21 being firmly fixed to the land-side 2 of the plow by means of bolts 24, 25.

The land-side and mold board of the plow may be cast in a single piece and of some suitable hard metal, for example, steel, the full size of the implement for practical purposes being in the neighborhood of twelve inches in length, exclusive of the handle shank, and some six inches in breadth, including the bearing wheel 12. The plow itself may be about two inches wide at its widest portion and something like eight inches long, the mold-board being somewhat over half of that length. In any event, the size is such as to render it a simple matter for an operator to push the implement along at the proper depth in front of him so as to very quickly and effectively perform work which has hitherto been done only slowly and with great care.

It is obvious that changes might be resorted to in the form and arrangement of the several parts without departing from the spirit and scope of my invention; hence I do not wish to limit myself strictly to the structure herein shown and described, but

What I claim is:—

1. An edge trimmer for lawns comprising a plow-beam, a plow having a mold-board and landside fixed to and depending from the beam, a cutter made fast to the front portion of the beam to cut the edge of the lawn in advance of the plow, a handle projecting in a slanting direction rearwardly from the plow for enabling the operator to push the plow and cutter forward and a bearing wheel attached to the beam at one side of the mold-board by means of an arched bar whereby the operator pushing the plow may have an unobstructed view of the edge of the lawn at the point where the cutter and plow are operating while the plow itself is limited as to depth of cut.

2. An edge trimmer for lawns comprising a plow-beam, a plow fixed to and depending from the beam and having a landside and mold-beam, the landside being extended rearwardly to a considerable distance beyond the mold-board to provide a stable bearing upon which the plow may be pushed forward, a handle attached to and extending rearwardly from the plow for pushing it forwardly, and a bearing wheel attached to the beam at one side of the mold-board for limiting the depth of cut of the plow.

In testimony that I claim the foregoing as my invention, I have signed my name in presence of two witnesses, this thirty-first day of July, A. D. 1908.

CHARLES C. WHEELER.

Witnesses:
   GERRIT J. DIEKEMA,
   MAUDE WILLIAMS.